United States Patent [19]
Perot, Jr.

[11] 3,751,927
[45] Aug. 14, 1973

[54] APPARATUS FOR ENTRENCHING SUBMERGED ELONGATE STRUCTURES

[75] Inventor: Joseph Charles Perot, Jr., Natchitoches, La.

[73] Assignee: Brown & Root, Inc., Houston, Tex.

[22] Filed: Feb. 22, 1972

[21] Appl. No.: 227,844

[52] U.S. Cl. ............................ 61/72.4, 37/63
[51] Int. Cl. ...................... E02f 5/02, F16l 1/00
[58] Field of Search .................. 61/72.4, 72.1; 37/63, 80

[56] References Cited
UNITED STATES PATENTS
| | | | |
|---|---|---|---|
| 3,217,499 | 11/1965 | Ishiki | 61/72.4 |
| 3,338,059 | 8/1967 | Tittle | 61/72.4 |
| 3,504,504 | 4/1970 | Elliott | 61/72.4 |

Primary Examiner—Jacob Shapiro
Attorney—James E. Cockfield

[57] ABSTRACT

An apparatus for entrenching submerged elongated structures such as pipelines and the like, including a skid frame having port and starboard pontoon runners with a box frame operable to bridge the pontoon runners over a pipeline to be entrenched. The box frame includes a first and second set of upper and lower pontoon spanning supports. Each of the supports includes inwardly facing port and starboard guide rails. Vertically and horizontally adjustable port and starboard cutter and eductor heads are ruggedly supported from the box frame guide rails and extend in close proximity to the surfaces of a pipeline to be entrenched. The port and starboard cutter and eductor heads both have a generally vertical-slant-vertical configuration so that the cutter and eductor heads extend along the lateral surfaces of the pipeline, slope beneath the pipeline and extend vertically beneath the pipeline. The head configuration enables the apparatus to rapidly and efficiently cut a trench having generally vertical side walls within the bed of the body of water and educt the loosened soil or detritus material to permit the pipeline to descend within a narrow walled trench within the bed of the body of water.

19 Claims, 15 Drawing Figures

Patented Aug. 14, 1973
3,751,927
7 Sheets-Sheet 1
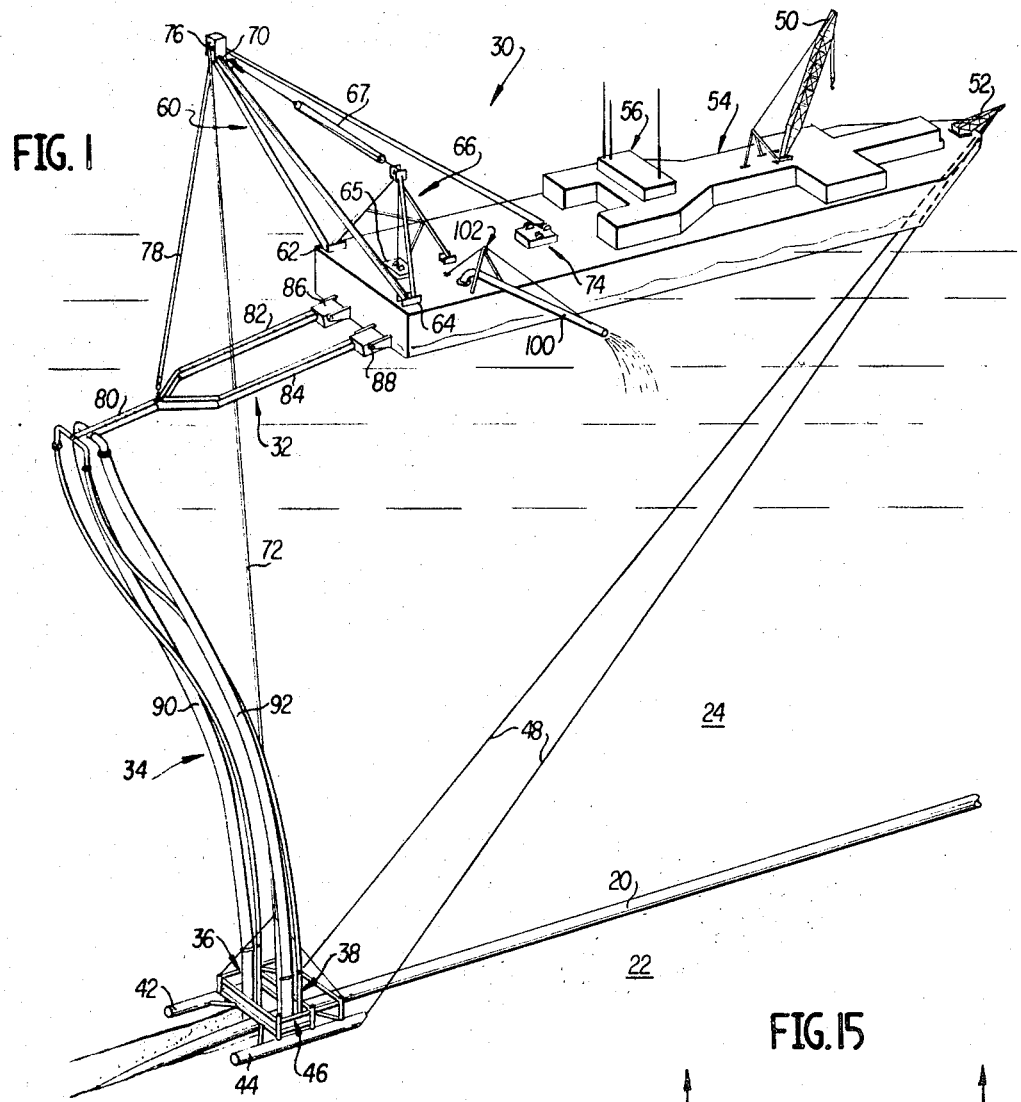
FIG. 1
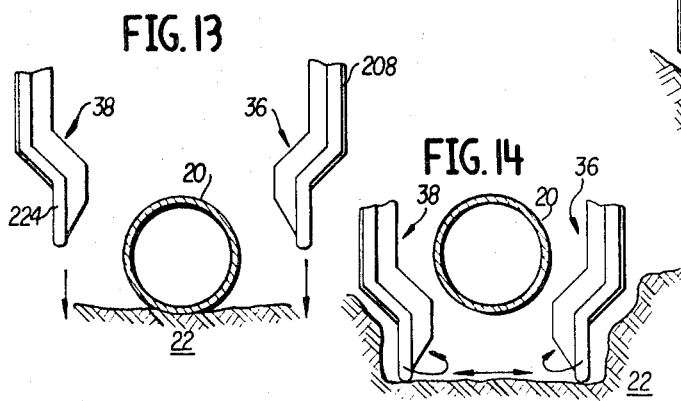
FIG. 13
FIG. 14
FIG. 15

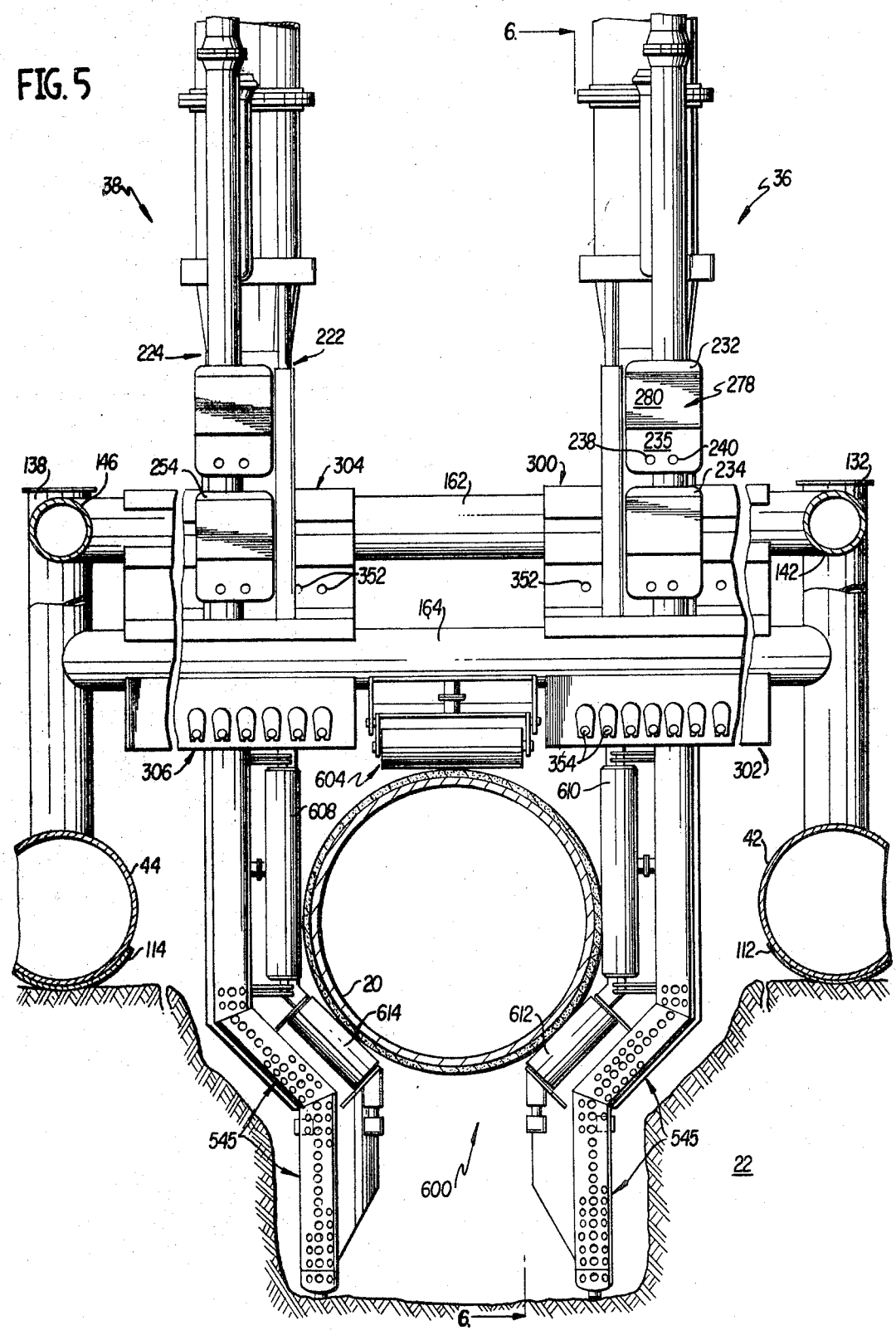

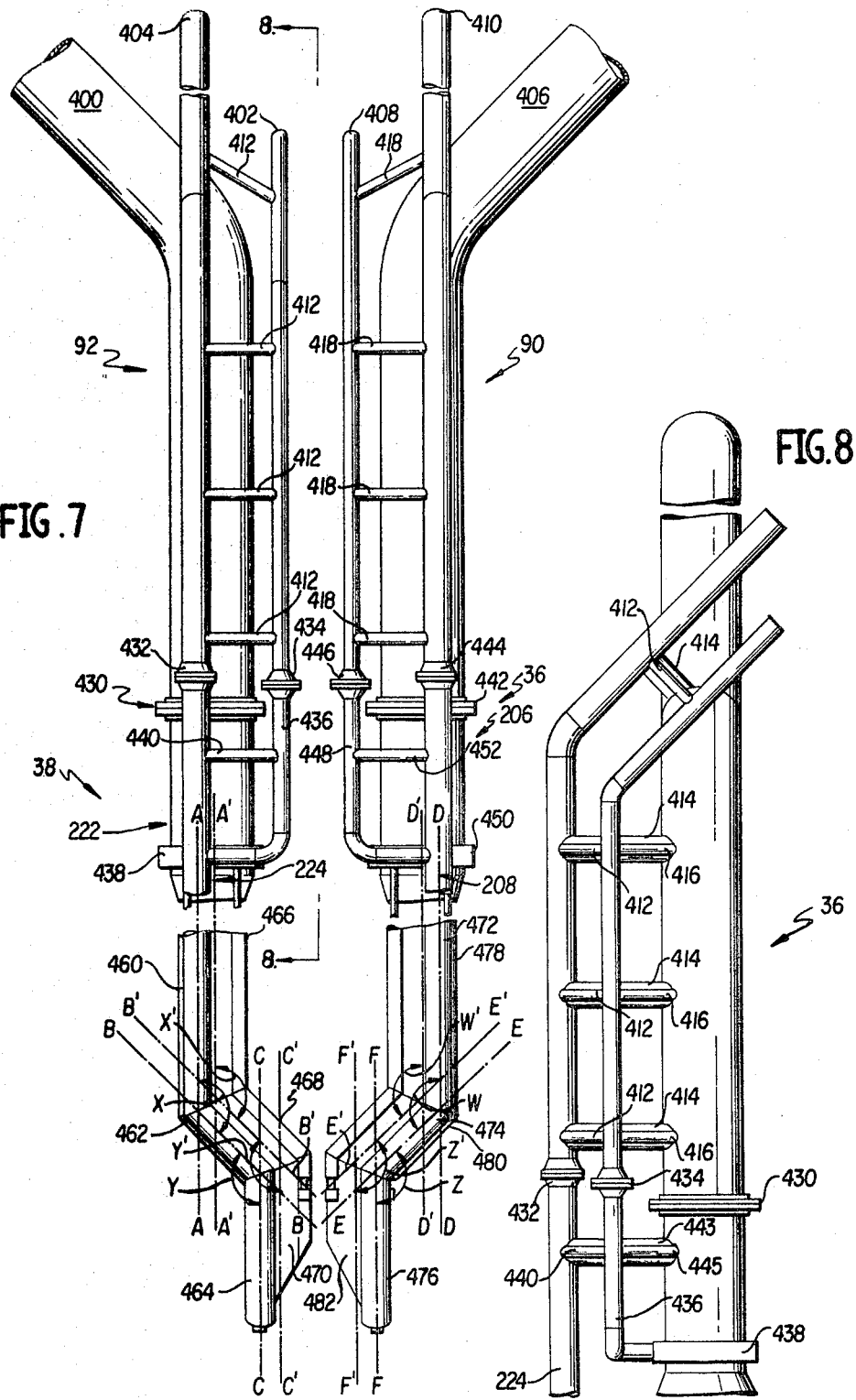

APPARATUS FOR ENTRENCHING SUBMERGED ELONGATE STRUCTURES

RELATED PATENTS

This application relates to and is an improvement of U.S. Pat. No. 2,755,632 — Hauber et al. entitled "Submarine Burying Apparatus" and U.S. Pat. No. 3,338,059 — Tittle entitled "Methods and Apparatus for Entrenching Submerged Elongate Structures" both assigned to the assignee of the subject application.

BACKGROUND OF THE INVENTION

This invention relates to an apparatus for entrenching submerged elongate structures and more particularly to an apparatus for entrenching or burying submarine pipelines.

With the discovery of offshore oil deposits and the subsequent drilling and production thereof, a problem has arisen in connection with an economical means of transporting the crude petroleum and gas from a drilling site to a shore collection location or an offshore transfer station. Frequently the most economical means for accomplishing transfer has been to construct submerged pipelines between the producing and collection locations. In this connection U.S. Pat. Nos. 3,280,571 — Hauber et al., 3,390,532 — Lawrence, 3,472,034 — Lawrence, 3,487,648 — Lawrence, and 3,507,126 — Rochelle et al., assigned to the assignee of the subject invention, disclose highly effective processes and apparatus for laying pipeline upon the bed of a body of water.

Shortly following the discovery that pipelines could be economically laid on the bed of a body of water significant problems were encountered in connection with shifting of the line due to currents, pipeline corrosion, and pipeline damage caused by anchors, fish nets and similar equipment. In order to obviate or minimize the above noted difficulties, it has been the practice in the past to bury or entrench the submerged pipeline structure beneath the water bed.

In this connection a number of techniques have been successfully utilized with varying degrees of success. One of the earliest methods for burying submerged elongated structures may be discovered by reference to U.S. Pat. Nos. Re. 20,665 — Lawton, 2,142,135 — Lawton, and 2,248,243 — Lawton, which disclose in essence a plow structure designed to be dragged through the water bed by a support vessel. A cable is then buried within the plow furrow.

While the above technique has achieved a degree of success, it will be realized that deep or large trenches such as are necessary to bury large gas and oil carrying pipelines would be in all essential respects impossible to form merely with the above noted plow sleds.

Another known technique for burying submerged pipelines involves the utilization of rotary cutters which are designed to be positioned generally beneath a pipeline to be entrenched and are driven by fluid or electric motors. The rotary cutters carve out a trench within the water bed and thus permit the pipe to descend within the trench. Examples of rotary cutter entrenching machinery may be noted by reference to U.S. Pat. Nos. 3,004,392 — Symmank, 3,103,790 — Popich, 3,238,734 — Rhodes, 3,429,131 — Martin, 3,429,132 — Martin, and 3,583,170 — De Vries.

Rotary cutter devices have also been successfully utilized in the past and continue to be effectively utilized, however, it will be appreciated that such devices are somewhat elaborate in design requiring as a minimum at least one moving cutter head and motor capable of operation in a submerged environment. Such a device, which must work in a highly corrosive environment, involves many moving parts and is therefore likely to require considerable maintenance and repair. Moreover, rotary cutters require a significant amount of power which is often difficult to transfer to a deep submerged location.

Alternate devices for entrenching submerged pipelines which are free from many of the disadvantages of rotary cutters may be had by reference to U.S. Pat. Nos. 2,879,649 — Elliott, 3,217,499 — Isao Ishiki, 3,368,358 — Elliott, 3,434,297 — Gretter et al., 3,504,504 — Elliott, 3,505,826 — Harmstorf and 3,576,111 — Henry, Jr. and the above noted U.S. Pat. Nos. 2,755,632 — Hauber et al. and 3,338,059 — Tittle.

The above burying devices are designed for cutting action by focusing high pressure fluid streams, from a jetting head, into the water bed. The jetting head typically is supported in an operable posture upon opposite sides of a pipeline to be entrenched by a skid frame. The high pressure fluid jets serve to flush away the soil or water bed and leave a trench in the wake of the burying apparatus.

While such previously known jetting devices are highly advantageous, room for significant improvement remains. In this connection previously known devices have tended to form unnecessarily wide valleys or sloping sided trenches within the water bed. Therefore, unnecessary time and effort must be expended to backfill the trench. Moreover the rate of advancement of the apparatus through the water bed is diminished if an excessive amount of the water bed is flushed away.

It would therefore be highly desirable to provide an apparatus for entrenching submerged elongated structures which would be capable of cutting deep and wide submerged trenches to accommodate large pipeline diameters. Further it would be desirable to provide an entrenching apparatus which would exhibit the characteristics of being relatively inexpensive initially and highly rugged and reliable in operation while simultaneously being efficient and rapid in entrenching a pipeline without forming an unnecessarily large trench. Moreover it would be additionally desirable to provide a rugged entrenching apparatus capable of horizontal and vertical adjustment to accommodate a large variety of pipeline sizes.

OBJECTS AND SUMMARY OF THE INVENTION

OBJECTS

It is a general object of the invention to provide an apparatus for entrenching submerged elongate structures which will obviate or minimize problems of the type previously described.

It is a particular object of the invention to provide an apparatus for embedding submerged elongate structures which will be simple in design and easily constructed with a minimum number of movable parts.

It is another object of the invention to provide an apparatus for entrenching submerged elongate structures which will be capable of vertical and horizontal adjustment for utilization with a variety of pipeline diameters.

It is a further object of the invention to provide an apparatus for entrenching submerged elongate structures which will provide an efficient trench forming operation and minimize the width of the trench formed to accommodate a particular pipeline being buried.

It is a still further object of the invention to provide an apparatus for entrenching submerged elongate structures which will be extremely rugged in design and therefore will be capable of use with large pipelines where deep trenches are required.

It is a specific object of the invention to provide an apparatus for entrenching submerged elongate structures which will have a cutting head assembly operable to minimize the width of a trench formed during a burying operation.

It is a further specific object of the invention to provide an apparatus for entrenching submerged elongate structures having in combination a cutting and eductor head assembly which will minimize the width of a trench formed during a burying operation.

It is another specific object of the invention to provide a jetting apparatus for entrenching submerged elongate structures which will have a ruggedized mounting between a burying sled and at least a cutter head which permits horizontal and vertical adjustment of the cutter head with respect to the sled.

BRIEF SUMMARY

An apparatus suitable to accomplish at least some of the foregoing objects comprises a burying sled including port and starboard pontoon runners which support a box frame bridging structure having first and second sets of vertically spaced horizontal spanning beams. A port cutter and eductor head and a starboard cutter and eductor head are vertically and horizontally adjustably supported upon the first and second sets of spanning beams. The port and starboard cutter and eductor heads are operably designed to extend in close proximity along the lateral and lower surfaces of a conduit to be entrenched and vertically beneath the conduit to be entrenched to form a narrow trench within the bed of a body of water sufficiently wide enough to accommodate the particular dimensions of the pipeline to be buried while minimizing the amount of the water bed that is cut away, fluidized and removed.

THE DRAWINGS

Other objects and advantages of the present invention will become apparent from the following detailed description of a preferred embodiment of the invention taken in conjunction with the accompanying drawings, wherein:

FIG. 1 is a perspective view of an apparatus for entrenching a submerged pipeline including a control barge operably connected to a submerged burying sled according to a preferred embodiment of the invention;

FIG. 5 is a detailed partly broken away end view of the burying sled disclosing the encompassing relationship exhibited by the port and starboard cutter and eductor heads with respect to a pipeline to be entrenched.

FIG. 7 is a partial view disclosing the port and starboard cutter and eductor head assemblies including a complement of high pressure conduits connected thereto;

FIG. 8 is a cross-sectional view taken along section line 8—8 of FIG. 7 and further discloses the connection of the cutter head feed conduit, high pressure fluid conduit and eductor conduit;

Figure 12:
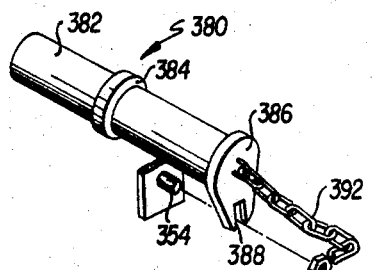
Figure 11:
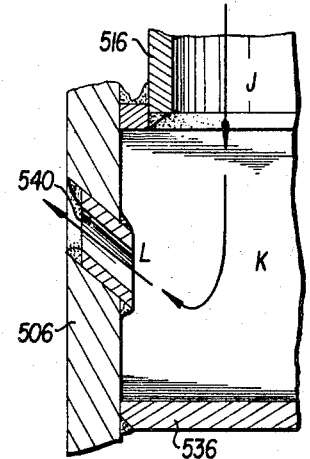
Figure 10:
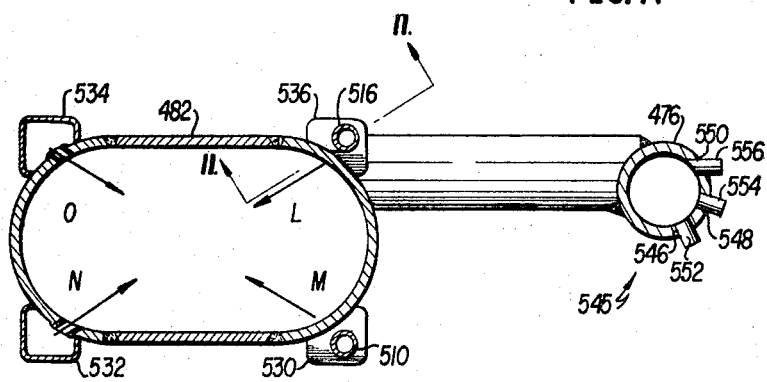
FIG. 10 is a cross-sectional view taken along section line 10—10 of FIG. 6 and discloses nozzles in the cutter head along with plenum chambers connected to the eductor head to facilitate injection of high pressure fluid into the interior of the eductor head.

FIG. 11 discloses a detail cross-sectional view taken along section line 11—11 in FIG. 10 and discloses an upwardly directed nozzle through the eductor side wall for directing fluid from a plenum chamber into the interior of the eductor head;

FIG. 12 is a perspective view of a lock bolt utilized to retain the cutter and eductor heads in a fixed horizontal position with respect to the burying sled once the cutter and eductor heads are properly positioned relative to a pipeline to be entrenched;

FIGS. 13-15 (note sheet 1) schematically disclose an operational sequence for adjusting and positioning the port and starboard cutter and eductor heads around a pipeline to be entrenched including vertically inserting the cutter and eductor heads over a pipeline, horizontally moving the cutter and eductor heads to a close encompassing proximity with the pipeline, subsequently spreading the cutter and eductor heads following the burying operation and lifting the cutter and eductor heads away from surrounding engagement with the buried pipeline.

DETAILED DESCRIPTION

GENERAL STRUCTURE

Referring now to the drawings and more particularly to FIG. 1 thereof there will be seen an elongate structure 20, such as for example a pipeline, underwater cable or the like, laying upon the bed 22 of a body of water 24. The pipeline 20 has been previously laid along a desired route by devices such as disclosed in the previously mentioned U.S. Pat. Nos. 3,280,571 — Hauber, 3,390,532 — Lawrence, 3,472,034 — Lawrence, 3,487,648 — Lawrence, and 3,507,126 — Rochelle.

Subsequent to the laying operation it is often desired to entrench the pipeline within the bed of the body of water. Apparatus to accomplish an entrenching operation by a preferred embodiment of the invention is generally disclosed in FIG. 1 and includes a floating marine vessel, such as a burying barge 30, a wishbone 32 connected to the stern of the bury barge, a set of cutter and eductor head lines 34 which lead from the wishbone 32 to a port cutter and eductor head combination 36 and a starboard cutter and eductor head combination 38. The cutter and eductor heads are operably designed to be positioned upon opposite sides of a pipeline 20 to be entrenched. The cutter and eductor heads are operatively carried by a submergeable marine vessel such as a burying sled 40 including port and starboard pontoon skids 42 and 44 interconnected by a bridging box frame 46. The forward ends of the pontoon skids 42 and 44 are connected to the bow of the burying barge 30 by means of a first and second wire rope or cable 48.

The bury barge 30 is provided with the usual complement of essential working equipment such as, for example, a deck crane 50, a bow boom 52, personnel, storage and equipment quarters 54 and a control bridge 56. An A-frame 60 is mounted upon the stern of the burying barge and is pivotally supported at its base upon first and second bearing pads 62 and 64, respectively. The A-frame may be pivoted about the bearing pads by actuation of a winch 65 which is operatively connected to a block and tackle 67 fitted between the apex of the A-frame and the apex of a tripod 66.

The A-frame 60 serves a dual role by first carrying a lower sheath 70 at its apex which serves to guide a pair of wire ropes 72 which extend between deck winches 74 on the deck of the barge and mountings on the box frame 46 of the burying sled 40. By selective actuation of one or more of the deck winches 74, the burying sled 40 may be vertically raised or lowered as desired. Secondly the A-frame 60 is provided with an upper sheave 76 which serves to guide a second pair of wire ropes 78 which extend between the base leg 80 of the wishbone 32 and the deck winches 74. Selective actuation of an appropriate deck winch will thus serve to raise or lower the wishbone as desired.

The wishbone 32 includes first and second tines 82 and 84 which are pivotally connected to the stern of the lay barge 30 by first and second bifurcated mounting brackets 86 and 88. The base leg 80 of the wishbone 32 is connected by branch legs to the port and starboard eductor and cutter head lines 90 and 92 which in turn are connected to the port and starboard cutter and eductor heads 36 and 38. The wishbone 32 serves to connect lines 90 and 92 with one or more compressors or pumps as desired. In this connection the interior of the bury barge hull is provided with fluid jet pumps, suction pumps or compressors and the like (not shown).

Connected to extend over one side of the barge 30 is an exhaust conduit 100 which is pivotally supported by an A-frame winch combination 102 and which is in fluid communication with one or more of the suction pumps within the barge hull.

GENERAL OPERATION

In general operation when it is desired to entrench or bury a previously laid elongate conduit 20 within the bed of a body of water, the bury barge 30 is positioned generally vertically above the pipeline. The burying sled 40 is then lowered from the A-frame 60 until the port and starboard cutter and eductor heads 36 and 38 straddle a pipeline to be entrenched. As previously mentioned the burying sled 40 is connected to the bow of the bury barge 30 by wire ropes 48 suspended from a boom 52. Thus, as the barge 30 is navigated along the conduit route by the utilization of well known anchor winching techniques the burying sled 30 will be pulled along the conduit.

In order to entrench the conduit within the bed of the body of water pumps within the hull of the bury barge 30 pump high pressure fluid down the high pressure lines and into the port and starboard cutting heads. The high pressure fluid is released through orifices in the cutting head and jets against the water bed to fragment and erode away the soil. Eductor heads are positioned adjacent to each of the cutting heads and by means of a suction pump within the barge hull the fluidized detritus material may be withdrawn from the volume surrounding the pipeline and pumped over the side of the bury barge 30 through conduit 100. As the seabed is cut away by the jetting head, fragmentized and subsequently removed by the eductor system, it will be appreciated that the negatively buoyant elongate conduit 20 will descend within the trench and thus be buried within the water bed. The depth of the trench will vary according to the particular circumstances but depths from a few feet to 15 or more feet may be provided with the subject apparatus.

An alternative means of educting the fluidized detritus material from adjacent the pipeline comprises running high pressure air conduits down to the eductor heads and tapping the high pressure conduits into the lower portions thereof to provide air bubbles with the eductor line which will serve to lift the particulate material by a gas lift technique.

In some instances it is preferred to lift the detritus material up to the vessel and dump it overboard through exit conduit 100 as previously discussed. However, in other instances when using the gas lift technique it may be preferred merely to direct the detritus material away from the immediate area of the trench. In such event the eductor lines need not extend up to the bury barge but may be merely directed away from the freshly cut trench.

It will be appreciated that individual barges may vary slightly from the above in terms of equipment and operation, however, as a general illustrative matter the above description is accurately representative.

THE BURYING SLED

Figure 2:
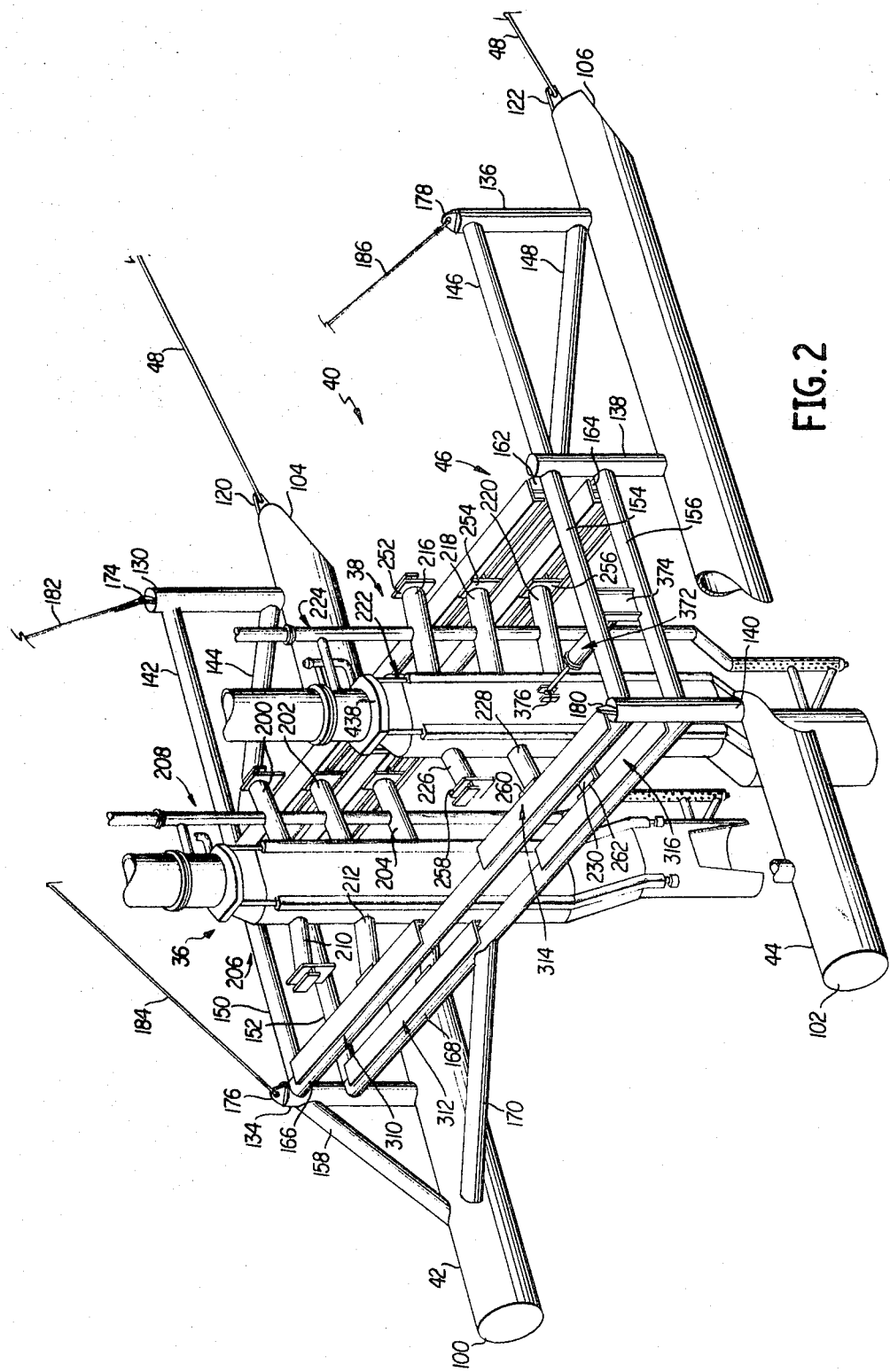
FIG. 2 is a perspective view of a burying sled including pontoon runners, a box frame, and vertically and horizontally adjustable port and starboard cutter and eductor heads.
Figures 3, 4:
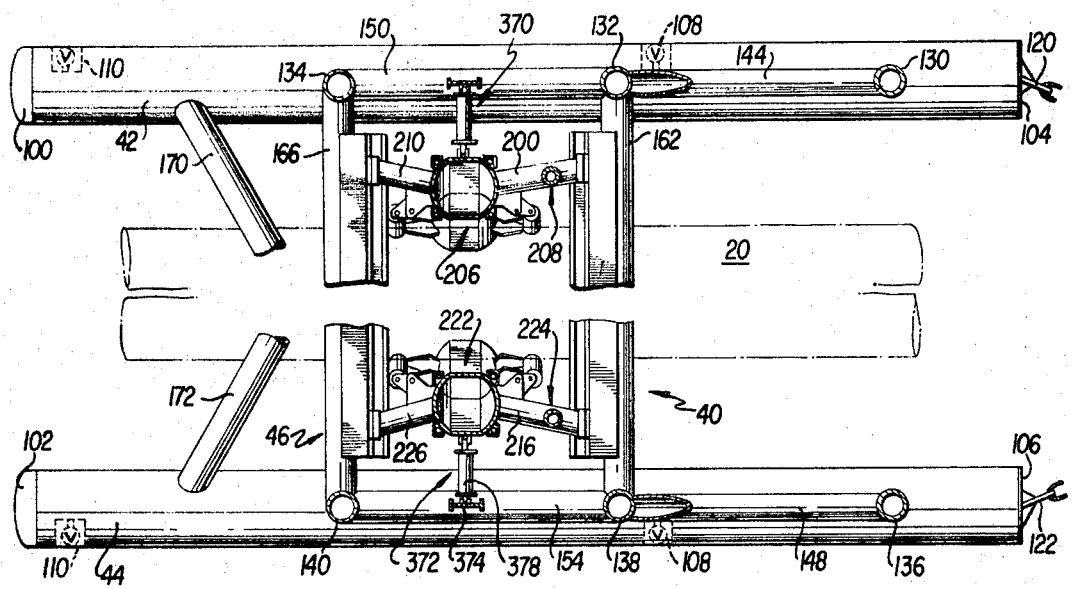
FIG. 3 is a side view of FIG. 2 disclosing the cooperation of the burying sled with a pipeline to be entrenched.
FIG. 4 is a top view of FIG. 2 particularly disclosing apparatus for horizontally adjusting the port and starboard cutter and eductor heads with respect to a pipeline to be entrenched.

Referring now particularly to FIGS. 2, 3 and 4, there will be seen in perspective, side and top detailed views, respectively, a preferred embodiment of the burying sled 40. As previously mentioned, the burying sled includes a port pontoon skid 42 and a starboard pontoon skid 44. The pontoon skids are generally hollow and are provided with hemispherical end caps 100 and 102, respectively, at the stern ends thereof and sloping face plates 104 and 106 at the bow ends thereof to define fluid tight variable buoyancy chambers. Ballast valves 108 and blowing valves 110 are connected into each of the port and starboard pontoon skids. These valves may be conventional hand-operated structures or remotely controllable as desired. In this connection high pressure conduits may be connected to the valves, selectively or permanently.

As specifically illustrated in FIGS. 3 and 5, each of the pontoon skids 42 and 44 may be fitted with abrasion wrappers 112 and 114, respectively. The abrasion wrappers or plates have an arc shaped cross-section which enables them to be fitted in juxtaposition with the bottom curved portions of the pontoon skids and thus to functionally enhance the rigidity and wear characteristics of the pontoon runners.

First and second towing pad eyes 120 and 122 are fixedly connected to the bow end of the port and starboard pontoon skids 42 and 44 to provide a ready junction source for wire cables 48 extending from the vessel 30 to the burying sled 40.

The port and starboard pontoon skids 42 and 44 have generally parallel longitudinal axes and as previously mentioned are operably designed to slide along the bed of a body of water upon opposite sides of a pipeline 20 to be entrenched within the water bed. The pontoon skids 42 and 44 support a bridging box frame structure 46 which includes upstanding generally vertical posts or columns 130, 132 and 134 connected to the upper surface of the port pontoon 42 and upstanding posts or columns 136, 138 and 140 connected to the starboard pontoon 44.

Columns 130 and 132 are interconnected for structural rigidity by a horizontal brace 142 and a sloping strut 144. In like manner, columns 136 and 138 are structurally interconnected by a brace 146 and a strut 148.

Column 132 is interconnected with column 134 by upper and lower side braces 150 and 152, respectively. Columns 138 and 140 in like manner are interconnected by upper and lower side braces 154 and 156, respectively. The upright columns 130, 132 and 134 and upright columns 136, 138 and 140 are thus structurally interconnected by a rigid latticework of braces and struts. The rearmost or stern columns 134 and 140 may be additionally supported by batter braces 158 and 160, respectively. The braces and struts are depicted as being formed from tubular members, however, it will be realized that other structural designs such as I-beams, T-beams, L-channels and the like, may be effectively utilized if desired.

Normally extending lifting pad eyes 174, 176, 178 and 180 are fixedly connected to the uppermost portion of columns 130, 134, 136 and 140, respectively, to provide an attachment junction for wire ropes 182, 184, 186 and 188, respectively, which in turn are united at a location above the burying sled 40 and connected to steel cables 72 for facilitating raising and lowering movement of the burying sled, as previously described.

Columns 132 and 138 are interconnected by upper and lower vertically spaced horizontally extending spanning beams 162 and 164, respectively. Note FIG. 6. In like manner, columns 134 and 140 are interconnected by generally horizontally extending vertically spaced upper and lower spanning beams 166 and 168, respectively. The lower horizontal beam 168 may additionally be interconnected with the starboard and port pontoons by first and second generally horizontally sloping braces 170 and 172, respectively.

As described above and as best illustrated in FIGS. 2-6 the upright columns 132, 134, 138 and 140 together with the upper and lower side braces and upper and lower spanning beams form a generally rectangular box frame 46 which normally spans and interconnects the port and starboard pontoon skids 42 and 44 and thus in all material respects will operationally serve as a bridge frame over a pipeline to be entrenched.

CUTTER AND EDUCTOR HEAD ADJUSTABLE CONNECTIONS

Adjustably positioned interiorly within the above described generally rectangular box frame 46 are port and starboard cutter and eductor heads 36 and 38, respectively.

Figure 6:
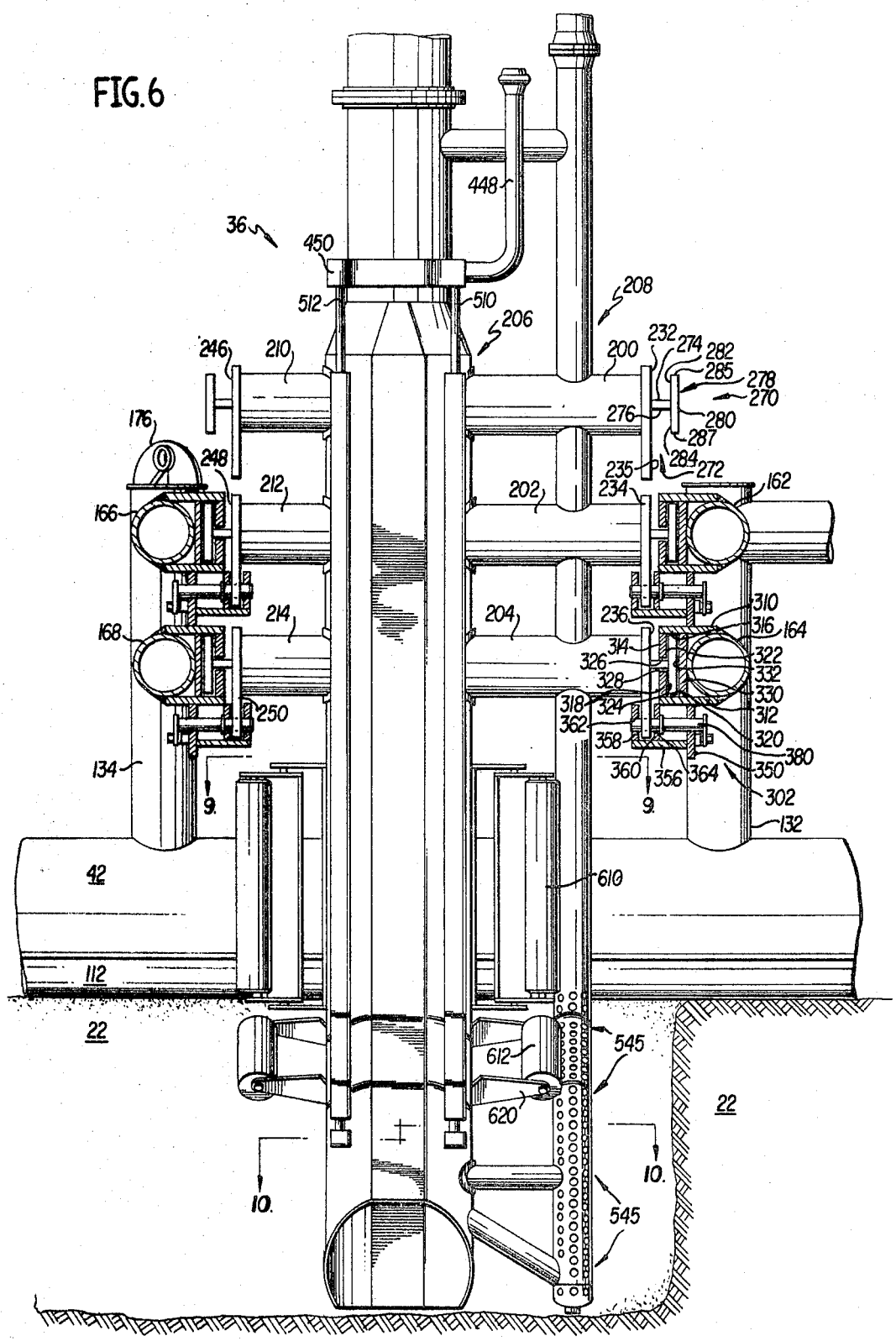
FIG. 6 is a cross-sectional view taken along section line 6—6 in FIG. 5 and discloses in detail the horizontal adjustment capability of the cutter and eductor heads with respect to the box frame of the burying sled.

As best illustrated in FIGS. 2 and 6 the port cutter and eductor head 36 is provided with a plurality of cantilever fore supporting arms 200, 202 and 204 which are vertically spaced and fixedly connected at one end to the outer periphery of the fore portion of eductor head 206. The cantilever support arms 200, 202 and 204 are also fixedly connected to cutter head 208 which extends in a generally coextensive posture with eductor head 206 in a manner which will be described in detail hereinafter.

A second plurality of cantilever generally horizontally extending vertically spaced support arms 210, 212 and 214 are fixedly connected at one end to the outer periphery of an aft portion of the eductor head 206.

The starboard cutter and jetting head, in a similar manner, and as illustrated in FIG. 2, is provided with a plurality of generally horizontally extending and vertically spaced cantilever support arms 216, 218 and 220 which are fixedly connected to a fore portion of the starboard eductor head 222 and which are also fixedly connected to a starboard cutter head 224. Moreover a plurality of generally horizontally extending and vertically spaced cantilever support arms 226, 228, 230 extend from an aft portion of the eductor head 222.

While only three generally fore and aft support arms have been disclosed in connection with the port and starboard cutter and eductor heads it will be appreciated by those skilled in the art that the above-mentioned plurality of cantilever support arms may include a substantially greater number as increased vertical adjustment capability is desired.

Referring now to FIG. 6 cantilever support arms 200, 202 and 204 are fitted at the free ends thereof with identical bearing and locking plates 232, 234 and 236, respectively. Illustrative of the plates 232, 234 and 236 is plate 232 which is shown provided with a generally planer rectangular bearing face 235, as best illustrated in FIGS. 5 and 6. The bearing plate 232 is provided in a lower portion thereof with first and second horizontally spaced locking apertures 238 and 240, the function of which will be discussed in detail hereinafter. The aft cantilever support arms 210, 212 and 214 of the port eductor head are in a like manner fitted with bearing and locking plates 246, 248 and 250, respectively. Plates 246, 248 and 250 are provided with locking apertures in a lower portion thereof identical to previously discussed locking plates 232, 234 and 236.

The fore starboard cutter and eductor head cantilever support arms 216, 218 and 220 are in a like manner provided with bearing and locking plates 252, 254 and 256, respectively. Similarly the aft starboard support arms 226, 228 and 230 are provided with identical bearing and locking plates 258, 260 and 262.

As previously described the locking plates are all provided in a lower portion thereof with first and second locking apertures. Moreover each of the above described locking and bearing plates are provided with a T-shaped support runner 270, note pad 232 in FIG. 6.

Each support runner 270 includes a body web 272 which extends generally horizontally and transverse to the major axes of the eductor and cutter heads. The body web 272 functionally forms an upper 274 and a lower 276 horizontally extending bearing surface. The body web 272 is fitted at a free end thereof with a normally postured head plate 278 which provides a planer outwardly facing vertical bearing surface 280 and an inner upper vertical bearing surface 282 and an inner lower vertical bearing surface 284. Moreover the top 285 and bottom 287 edge portions of head plate 278 provide generally horizontally extending top and bottom bearing surfaces.

While the T-shaped support runners 270 have only been specifically described in connection with bearing and locking plate 232 it will be appreciated that each of the bearing and locking plates are provided with an identical T-shaped support runner.

Referring now to FIGS. 2 and 5 the upper and lower horizontally extending fore beams 162 and 164 are each provided with port,upper and lower and starboard,upper and lower guide rails 300, 302 and 304, 306, respectively. In like manner the upper and lower horizontally extending aft beams 166 and 168 are provided with port,upper and lower and starboard, upper and lower guide rails 310, 312 and 314, 316. Each of the guide rails are identically constructed and therefore the following detailed description in connection with guide rail segment 302, as particularly illustrated in FIGS. 5 and 6, is equally applicable to the remaining guide rail segments.

Guide rail segment 302 includes an upper horizontally extending plate 310 and a lower horizontally extending plate 312 both of which are fixedly connected at one of the ends thereof to an upper and lower surface respectively of horizontal beam 164. A downwardly, vertically extending plate 314 is connected to an inner surface 316 of upper plate 310 at the free end thereof and an upwardly vertically extending plate 318 is connected to an inner surface 320 of plate 312 at the free end thereof. The upper plate 314 and lower plate 318 are longitudinally extending and have inner bearing surfaces 322 and 324 respectively. The free edges of the upper plate 314 and lower plate 318 extend toward each other to form horizontally extending inner rail surfaces 326 and 328, respectively. A web 330 is connected between the inner surface 316 of plate 310 and the inner surface 320 of plate 312 at about a midspan portion thereof and abuts against a rear portion of of horizontal brace 164. Web 330 operably provides a horizontally and vertically extending inner bearing surface 332.

It will now be seen that the above described members and plates combine to define a generally T-shaped sliding guide bound, and thus defined, by inner bearing surfaces 332, 310, 322, 326, 328, 324 and 320. Each of the guide members are dimensioned such that the T-slot formed by the inner bearing surfaces are compatible with and slightly greater than the exterior surfaces of a respective T-slide 270 so that an intimate fit may be achieved to provide a rugged supporting junction which will eliminate any rocking motion of the cutter and eductor heads while simultaneously providing a horizontal adjustment capability.

The horizontal guide rails each include a locking assembly comprising a first downwardly extending plate 350 normally connected to the bearing plate 312. Locking plate 350 is provided with a plurality of apertures 352 as best illustrated in FIG. 5. Vertically displaced below each of the locking apertures 352 are retaining studs 354 which normally extend outwardly from the locking plate 350.

A horizontally extending base 356 extends rearwardly from the locking plate 350 and serves to support first and second normally extending spaced retainer plates 358 and 360. Retainer plates 358 and 360 are each provided with a plurality of apertures 362 and 364 respectively which are coaxially aligned with locking apertures 352 fashioned through the locking plate 350. Retainer plates 358 and 360 are operatively spaced on the base plate 356 so that when a T-slide 270 is positioned within a guiding rail the lower portion of the bearing and locking plate will be snugly received between the securing plates 358 and 360. The apertures 238 and 240 in the bearing and locking plates are spaced from the bottom thereof so as to have axes which will be alignable with the axes of locking apertures 362, 364 and 352.

Once the apertures 362, 364 and 352 and the apertures 238 and 240 are brought into alignment a pair of locking bolts or pins 380 may be manually slid into position to lock the plate to the guide rail and thus fix horizontal movement of the cutter and eductor heads with respect to the box frame.

In the above connection a detail view of a locking bolt or pin 380 is shown in FIG. 12. The pin 380 is formed having a solid shaft 382 dimensioned to be snugly receivable within apertures 362, 364 and 352. A retaining ring or lip 384 surrounds a mid portion of the shaft 382 and serves to limit axial movement of the pin between plate 360 and plate 350 so that the pin may not be lost in a submerged environment during an adjustment operation. The pin 380 is also fitted with a generally pear shaped end cap 386 having a slot 388 formed in a lower neck portion thereof. The slot 388 is dimensioned to be slidable over a corresponding normally projecting stud 354. A nut 390 is connected to the end cap 386 by a suitable flexible connector 392 and is designed to be manually engageable with stud 354 so that the pin 380 may be normally retained in a locking posture.

In a preferred embodiment each of the apertures 352 are provided with a locking pin 380. In an alternate embodiment, however, individual apertures 352 may be replaced by a horizontally extending slot (not shown) and therefore only two locking pins 380 would be utilized, one to accommodate each of the pair of apertures in the lower portion of the locking plates.

The horizontal extent of each of the guide and locking rails is from a position adjacent to a corresponding upright column of the box frame to a location spaced from the center of the bearing sled, as best illustrated in FIGS. 2 and 5.

In order to effectuate horizontal adjustment of the port and starboard cutter and jetting heads 36 and 38 first and second horizontally actuatable fluid motors 370 and 372 are provided, as illustrated in FIGS. 2 and 4. Fluid motor 372 is pivotally connected at the ends thereof between a base plate 374 which extends between horizontal box frame side braces 154 and 156 and a pivotal bearing pad 376 mounted upon a lateral surface of the starboard eductor head 222. The fluid motor 372 comprises a piston and cylinder assembly 378 which may be water actuatable in a manner well known in the art. In this connection fluid lines (not shown) connect the cylinder with a source of pressurized fluid which typically is maintained on board barge 30.

An identical fluid motor 370 is connected on the port side of the burying sled and functions in cooperation with fluid motor 372 to horizontally slide the cutter and eductor heads 36 and 38 on the guide rails to position the cutter and eductor heads optimumly with respect to a pipeline to be buried. After the pipeline is snugly surrounded by the cutter and eductor heads the locking pins 380 may be manually locked into place to retain the proper horizontal spacing of the cutter and eductor heads throughout the burying operation.

CONDUIT GUIDES AND REMOTE SENSING APPARATUS

Referring now to FIGS. 3–6 and 9 there will be seen a plurality of fore and aft supporting rollers 600 and 602 designed to encompass a pipeline to be buried and thus maintain the sled in a porperly aligned posture with respect to the central axis of a pipeline to be entrenched.

Referring now specifically to FIG. 5, it will be seen that the plurality of fore guide rollers 600 include an upper roller 604 having a generally horizontally extending axis, a pair of side rollers 608 and 610 having generally vertically extending axes, and a pair of bottom rollers 612 and 614 having inwardly sloping axes.

The upper roller 604 and the side rollers 608 and 610 are all pivotally mounted within bifurcation brackets fixedly connected to the horizontal beam 164 and the eductor heads 206 and 222 respectively and are designed to actuate load cells associated therewith to signal at a remote location contact of the pipeline with the rollers. In an individual structural and functional manner the rollers, mountings, load cells and remote indicators associated therewith are identical with those disclosed in U.S. Pat. No. 3,507,126 — Rochelle et al., particularly in connection with FIGS. 7 and 8 of the drawings and columns 12–14 of the specification. The above noted pertinent portion of the Rochelle et al. patent is hereby incorporated by reference as though set forth at length.

Positioned generally beneath the elongated conduit are port and starboard inclined supporting roller assemblies 612 and 614, respectively. These roller assemblies unlike the previously described top and side roller assemblies 604, 608 and 610 are not pivotally mounted and connected to load cells but rather are merely rotatably attached between bifurcation bracket such as bracket 620 supporting roller 612 as illustrated in FIG. 6.

The stern set of rollers 602 are identical in structure and individual function with the forward set of rollers 600 and serve in cooperation therewith to maintain the sled in a properly aligned posture with respect to the elongate structure to be entrenched.

In this regard and as previously alluded to each of the vertically extending laterally engaging side rollers have load sensing cells associated therewith and may be connected to indicators on board vessel 30. The fore and aft horizontally extending top rollers also are provided with load sensing cells which feed signals to indicators on board the barge 30. Thus, an operator on board can monitor vertical and horizontal displacement of the sled with respect to the pipe and also vertical and horizontal rotational canting of the sled with respect to the pipeline. In this connection vertical canting of the sled about a horizontal axis is a highly significant parameter to monitor in that an imbalance of fore and aft readings may indicate that the sled cutter heads have encountered an immovable object or that the sled advance rate is too great for the particular soil encountered. Thus it is possible by skillful manipulation of the barge anchor winches to maintain an approximately parallel relationship of the longitudinal axes of the sled runners with respect to the longitudinal axis of the elongate structure to be entrenched during the entrenching operation and further to maintain an appropriate sled advance rate.

CUTTER AND EDUCTOR HEADS

Referring now particularly to FIGS. 7 and 8 there will be seen in combination cutter and eductor head assemblies 36 and 38 forming a further specific aspect of the subject invention.

The cutter and eductor heads are connected to service line bundles 90 and 92. Service lines 92 include an eductor conduit 400, a high pressure air conduit 402 and a high pressure fluid conduit 404. The service lines 90 include an eductor conduit 406, a high pressure air conduit 408 and a high pressure fluid conduit 410.

Conduits 404 and 402 of the cluster of service conduits 92 are interconnected by horizontal brace members 412 which are spaced vertically from one another to maintain a spatial relationship between the service conduits. In a like manner conduits 400 and 402 are provided with horizontal braces 414 and conduits 400 and 402 are interconnected by horizontal brace members 416. Thus at spaced elevations the conduits 400, 402 and 404 are fixedly interconnected by triangular brace arrangements of bracing members 412, 414 and 416.

In a similar manner the cluster of service conduits 406, 408 and 410 which comprise service lines 90 are interconnected by a triangular bracing network including horizontal braces 418 interconnecting the conduits 408 and 410.

The lower ends of conduits 400 and 404 are connected through flange fittings 430 and 432 to an eductor head 222 and a cutter head 224. The high pressure air conduit 402 is connected through a flange fitting 434 to lead conduit 436 which in turn connects into a high pressure plenum chamber 438 surrounding the eductor head 222 as best illustrated in FIGS. 2 and 3. The eductor head 222, the cutter head 224 and the high pressure air conduit extension 436 are interconnected by a generally horizontally extending triangular brace arrangement including horizontal members 440, 442 and 444 immediately below the flange connections 430, 432 and 434.

In like manner the port service lines 90 are connected through flange fittings 442 and 444 to the port eductor head 206 and the port cutter head 208. The high pressure conduit 408 is connected through a flange fitting 446 to an extension 448 which leads into a high pressure plenum chamber 450 which like plenum chamber 438 surrounds a corresponding eductor head.

The eductor head 206 and cutter head 208 are interconnected with each other and the high pressure air conduit extension 448 by a horizontal triangular brace arrangement which includes horizontal brace 452.

The particular shape of the cutter and eductor heads downstream of the plenum chamber is a highly significant aspect of the subject invention and will now be described in detail. More particularly and referring to FIG. 7 of the drawings it will be seen that the starboard cutter head assembly 224 includes an upper first segment 460 having a central longitudinal axis A—A which is generally vertically extending and is operable to be positioned along a lateral surface of a submerged conduit to be entrenched. The lower end of the first cutter head conduit segment 460 is connected to a second cutter head conduit segment 462 which is provided with a central longitudinal axis B—B which extends at an obtuse angle X with respect to the central longitudinal axis A—A of the first conduit segment 460. The lower portion of the second cutter head conduit segment 462 is connected to a third cutter head conduit segment 464 which has a central longitudinal axis C—C which extends at an obtuse angle Y with respect to the central longitudinal axis of the second cutter head conduit segment 462.

Positioned adjacent to and extending generally coextensive with the above described starboard cutting head is a starboard eductor head 222. The starboard eductor head 222 includes a first conduit segment 466 which extends generally vertically and has a central longitudinal axis A'—A' extending parallel with the central longitudinal axis A—A of the first cutter head conduit segment. Connected to the lower end of the first eductor head conduit segment 466 is a second eductor head conduit segment 468 having a central longitudinal axis B'—B' extending parallel with the axis of the second cutter head conduit segment B-B and at an obtuse angle X' with respect to the central longitudinal axis A'—A' of the first eductor head conduit segment 466. Connected to the free end of the second eductor head conduit segment 468 is a third eductor head conduit segment 470 which has a central longitudinal axis C'—C' which extends generally parallel with the central longitudinal axis C—C of the third cutting head conduit segment 464 and at an obtuse angle Y' with respect to the central longitudinal axis B'—B' of the second eductor head conduit segment 468.

Referring now to the port cutter and eductor head assembly 33, there will be seen a cutter head 208 which includes a first cutter head conduit segment 472 having a central longitudinal axis D—D extending generally vertically and is operably adapted to be positioned adjacent to a lateral surface of a submerged elongate conduit to be entrenched. Connected to the free end of the first cutter head conduit segment 472 is a second cutter head conduit segment 474 having a central longitudinal axis E—E lying at an obtuse angle W with respect to the central longitudinal axis D—D of the first cutter head conduit segment 472. Connected to the free end of the second cutter head conduit segment 474 is a third cutter head conduit segment 476 having a central longitudinal axis F—F lying at an obtuse angle Z with respect to the central longitudinal axis E—E of the second cutter head conduit segment 474.

Positioned adjacent to and extending generally coextensively with the port cutter head 208 is eductor head 206 which includes a first conduit segment 478 having a central longitudinal axis D'—D' extending generally parallel with respect to the central longitudinal axis D—D of the first cutter head conduit segment. Connected to the lower end of the first eductor head conduit segment 478 is a second eductor head conduit segment 480 having a central longitudinal axis E'—E' lying generally parallel with the central longitudinal axis E—E of the second cutter head conduit segment 480 and at an obtuse angle W' with respect to the central longitudinal axis D'—D' of the first eductor head conduit segment 478. Connected to the free end of the second eductor head conduit segment 480 is a third eductor head conduit segment 482 having a central longitudinal axis F'—F' lying generally parallel with respect to the axis F—F of the third cutter head conduit segment and at an obtuse angle Z' with respect to the central longitudinal axis E'—E' of the second eductor head conduit segment.

From the above detailed description it will be realized that the cutter and eductor heads 36 and 38 may be generally characterized as extending generally vertically downwardly along the lateral surfaces of a submerged elongated conduit to be entrenched, inwardly beneath a lower portion of a conduit to be entrenched and then generally vertically again downwardly beneath the submerged conduit to be entrenched. This vertical-slant-vertical cutter head arrangement enables a narrow trench to be formed within the bed of the body of water and thus minimizes problems of the type previously described.

Figure 9:
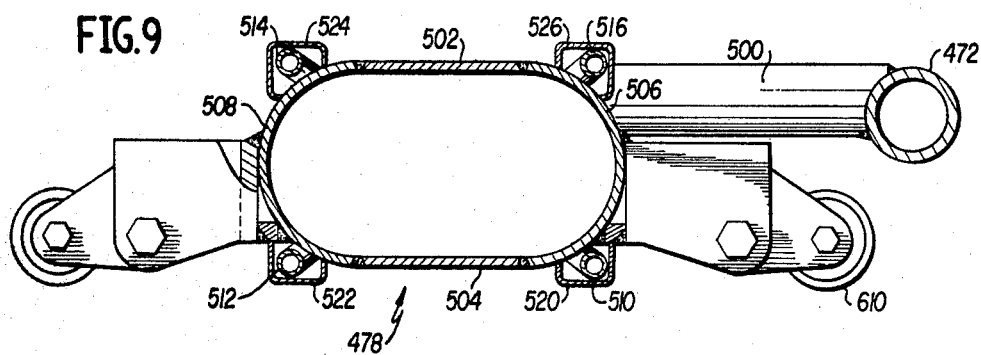
FIG. 9 is a cross-sectional view taken along section line 9—9 of FIG. 6 and discloses in cross-section the configuration of the eductor conduit with high pressure fluid lines connected thereto.

Referring now to FIGS. 9 and 10 there will be seen cross-sectional views taken along section lines 9—9 and 10—10 of the port cutter and eductor head 36 as seen in FIG. 6.

With particular reference now to FIG. 9, the first conduit segment 472 of the cutting heads is shown spatially fixed with respect to the first conduit segment 478 of the eductor head 206 by a generally horizontally extending brace 500.

The first conduit segment of the eductor head is formed having a pair of spaced generally parallel side walls 502 and 504 which are connected at their ends by semicircular end wall sections 506 and 508. The cross-sectional configuration, therefore, of the eductor head may be generally described as being somewhat elliptical or a circular cross-sectional configuration with an expanded central section.

Referring back to FIG. 6, the high pressure connecting air conduit 448 feeds into a plenum chamber 450 as previously described. The plenum chamber has tapped into it four conduits 510, 512, 514 and 516. These conduits extend along the exterior surface of the eductor head 206 and have mutually parallel axes which in turn are generally parallel with the major central longitudinal axis of the eductor head. The conduits 510, 512, 514 and 516 are shielded and protected from displacement by channel covers 520, 522, 524 and 526, respectively, which surround the conduits and are fastened to the exterior of the eductor head.

As best illustrated in FIGS. 6 and 10, the conduits 510, 512, 514 and 516 exit from their shielding covers 520-526 and feed into individual accumulation chambers 530, 532, 534 and 536, respectively.

FIG. 11 discloses a partial cross-sectional view taken along section line 11—11 in FIG. 10 and illustrates a feed conduit 516 feeding into a corresponding accumulation chamber 536 which in turn surrounds an upwardly directed nozzle 540. Nozzle 540 is operable to direct fluid into the eductor conduit in a generally upward direction. In this connection, arrows J, K and L in FIG. 11 indicate the path of fluid flow into the eductor head. With the circumferentially spaced locations of each of the accumulation chambers 530-536 and an upwardly directed nozzle through the eductor head wall, associated with each chamber, it will be seen that a circumferential inward flow of fluid may be achieved as indicated by arrows L, M, N and O in FIG. 10. Such symmetric flow will serve to promote uniform commingling of gas and detritus material within the eductor head to the end that the specific gravity of the detritus solution within the eductor head will be reduced, thus lifting the material up through the eductor by the well known gas lift technique.

A plurality of jetting apertures 545 are positioned through the walls of the first, second and third conduit segments of each cutter head as best illustrated in FIGS. 2, 3, 5 and 6. As previously mentioned high pressure fluid may be jetted through apertures 545 to erode away the water bed. In some instances the eroding action may be accentuated by adding nozzles within the apertures. In this connection as seen in FIG. 10, a nozzle 552, 554 and 556 may be positioned within each of the apertures 546, 548 and 550 as desired to direct high pressure fluid into a water bed formation. The particular selection of nozzles and the specific pattern of application may vary depending upon the type of soil encountered to most efficiently and rapidly cut away the submerged formation. One form of satisfactory nozzle design is disclosed in a U.S. Pat. No. 3,597,930 — Rochelle, note particularly FIGS. 8 and 9 and column 6 of the specification. The pertinent portion of the above noted Rochelle patent is hereby incorporated by reference as though set forth at length.

ADJUSTMENT OPERATION AND ADAPTATION FOR VARYING PIPELINE SIZES

In operation when it is desired to entrench a submerged pipeline, the exterior size of the pipeline is determined and the port and starboard eductor heads are vertically adjusted on board the barge to accommodate the pipeline in a triangular bearing posture within the top, side and bottom rollers 600 and 602.

Vertical adjustment is achieved by disconnecting fluid motors 370 and 372 and withdrawing all the locking pins 380. The eductor heads 36 and 38 are then slid along the guide rails toward the center portion of the sled where the T-connections may be disengaged with corresponding guides. Vertical shifting adjustment may then be performed and an alternate pair of T-shaped runners are slid into the upper and lower guide rails. For structural rigidity it will be appreciated that in a preferred embodiment an upper and lower connection is always maintained between the T-shaped runners and the guide rails. The horizontal fluid motors are then reconnected for subsequent submerged horizontal adjustment.

The burying sled is then lowered over the stern of the barge supported by the A-frame into a general posture such as that depicted in FIG. 1. The horizontal spacing of the axes of the third conduit segments of the eductor and cutter heads at this point in time are greater than the diameter of the pipeline to be entrenched as particularly disclosed in FIG. 13. High pressure fluid is then jetted through the cutter heads 208 and 224 until the seabed 22 is flushed away adjacent the pipeline. The cutter and eductor heads may then descend within the water bed and surround the conduit 20 to be entrenched, as illustrated in FIG. 14. At this point in time the fluid motors 370 and 372 will be actuated to horizontally close the cutter and eductor heads about the pipeline to be entrenched. When the pipeline is snugly encompassed a diver manually reinserts all of the locking pins 380 into the apertures in the locking rails to fixedly position the cutter and eductor heads and the burying operation progresses as previously described.

In this connection it will be appreciated that the seabed 22 to be cut away will cross-sectionally correspond to the vertical-slant-vertical configuration of the cutter and eductor heads as particularly illustrated in FIG. 5 and thus a minimum amount of the seabed will be flushed away, thereby enabling the pipeline to descend within the bed of the body of water and be readily covered in a rapid and efficient manner.

Upon completion of the burying operation a diver will again descend to the burying sled and loosen and withdraw all of the locking pins 380. The cutter and eductor heads may then be horizontally separated by actuation of fluid motors 370 and 372 as illustrated in FIG. 15. The sled may then be raised by the A-frame and repositioned upon the barge for transportation to another location as desired.

SUMMARY OF THE MAJOR ADVANTAGES

It will be appreciated that the above described apparatus provides a considerable advantage in the performance of entrenching submerged elongate structures.

Particular advantages are provided by the simplicity of design of the overall entrenching apparatus without utilizing submerged moving parts. In this connection the water bed is eroded away by the provision of fluid jets and the detritus material is then removed by a suction or gas lift system. Therefore it will be appreciated that submerged relative moving members are not required.

Moreover the subject entrenching apparatus is extremely rugged in design and may therefore be effectively utilized with large and weighty conduits without requiring an excessive amount of repair or maintenance.

The particular ruggedized horizontal and vertical adjustment connections permit the subject apparatus to accommodate a plurality of conduit diameters without sacrificing the capability of the apparatus to perform deep burying operations which require extremely rugged equipment.

A specific advantage of the subject invention comprises the particular configuration of the port and starboard cutter heads which may figuratively be described as vertical-slant-vertical. Such a head configuration enables the width of the trench to be minimized thus promoting cutting advancement rate and concurrently diminishing back filling requirements.

Associated with the advantages provided with the cutter heads configuration are those afforded by a similar vertical-slant-vertical configuration of the eductor heads which provide an efficient removal of detritus material from within the narrowly cut trench.

While the invention has been described with reference to a preferred embodiment, it will be appreciated by those skilled in the art that additions, deletions, modifications and substitutions or other changes not specifically described, may be made which will fall within the purview of the appended claims.

What is claimed is:

1. An apparatus for entrenching a submerged pipeline and the like within the bed of a body of water comprising:

a frame operable to be lowered over and transported along a submerged pipeline to be entrenched; and means connected to said frame for cutting a trench beneath a submerged pipeline within the bed of the body of water comprising, a first cutter head including
  a first conduit segment having a central longitudinal axis operably positionable generally vertically along one side of a pipeline to be entrenched, said first conduit segment having,
    a plurality of jetting apertures fashioned therein,
  a second conduit segment connected at one end to said first conduit segment, said second conduit segment having a central longitudinal axis extending at an obtuse angle with respect to the central longitudinal axis of said first conduit segment, said second conduit segment having,
    a plurality of jetting apertures fashioned therein,
  a third conduit segment connected at one end to the other end of said second conduit segment, said third conduit segment having a central longitudinal axis extending at an angle with respect to the central longitudinal axis of said second conduit segment and generally parallel with respect to the central longitudinal axis of said first conduit segment, said third conduit segment having,
    a plurality of jetting apertures fashioned therein, and
a second cutter head including,
  a first conduit segment having a central longitudinal axis operably positionable generally vertically along an opposite side of a pipeline to be entrenched, said first conduit segment having,
    a plurality of jetting apertures fashioned therein,
  a second conduit segment connected at one end to said first conduit segment, said second conduit segment having a central longitudinal axis extending at an angle with respect to the central longitudinal axis of said first conduit segment, said second conduit segment having,
    a plurality of jetting apertures fashioned therein,
  a third conduit segment connected at one end to the other end of said second conduit segment, said third conduit segment having a central longitudinal axis extending at an angle with respect to the central longitudinal axis of said second conduit segment and generally parallel with respect to the central longitudinal axis of said first conduit segment, said third conduit segment having,
    a plurality of jetting apertures fashioned therein,
wherein said first conduit segments of said first and second cutter heads have generally mutually parallel central longitudinal axes and are operatively adapted to extend generally vertically on opposite sides of a pipeline to be entrenched, and said third conduit segments of said first and second cutter heads have generally mutually parallel central longitudinal axes and extend generally vertically beneath a pipeline to be entrenched whereby the perpendicular distance between the generally mutually parallel longitudinal axes of said first conduit segments is greater than the perpendicular distance between the generally mutually parallel longitudinal axes of said third conduit segments.

2. An apparatus for entrenching a submerged pipeline and the like within the bed of a body of water as defined in claim 1 and further comprising:
  means connected to said frame for withdrawing particles of fluidized matter from adjacent said means for cutting comprising,
    a first eductor head having first, second and third conduit segments positioned adjacent to and extending generally coextensive with said first, second and third conduit segments respectively of said first cutter head, and
    a second eductor head having first, second and third conduit segments positioned adjacent to and extending generally coextensive with said first, second and third conduit segments respectively of said second cutter head.

3. An apparatus for entrenching a submerged pipeline and the like within the bed of a body of water as defined in claim 2 and further comprising:
  means connecting said first cutter head and said first eductor head to said frame for independent horizontal and vertical adjustability thereof with respect to said frame, and
  means connecting said second cutter head and said second eductor head to said frame for independent horizontal and vertical adjustability thereof with respect to said frame.

4. An apparatus for entrenching a submerged pipeline and the like within the bed of a body of water comprising:
  a burying sled, including
    first and second pontoon skids having generally mutually parallel longitudinal axes, said pontoon skids being operably spaced to straddle a submerged pipeline to be entrenched, and
    a box frame bridging said first and second spaced pontoon skids including,
      a first set of upper and lower vertically spaced horizontally extending spanning beams connected between said first and second spaced pontoon skids and extending generally normally with respect to the longitudinal axes of said pontoon skids, and
      a second set of upper and lower vertically spaced horizontally extending spanning beams connected between said first and second spaced pontoon skids and extending generally normally with respect to the longitudinal axes of said pontoon skids, said second set of spanning beams extending generally parallel with respect to said first set of spanning beams and being offset with respect thereto,
    a cutter and eductor head operably mounted between said first set of spanning beams and said second set of spanning beams on the port side of said burying sled for independent vertical and horizontal adjustment with respect thereto; and
    a cutter and eductor head operably mounted between said first set of spanning beams and said second set of spanning beams on the starboard side of said burying sled for independent vertical and horizontal adjustment with respect thereto.

5. An apparatus for entrenching a submerged pipeline and the like within the bed of a body of water as defined in claim 4 wherein said first and second pontoon skids include:
first and second longitudinally extending plate members having an arc shaped cross-sectional configuration connected in juxtaposition to a bottom portion of said first and second pontoon skids respectively.

6. An apparatus for entrenching a submerged pipeline and the like within the bed of a body of water as defined in claim 4 and further comprising:
upper and lower guide rails connected on the port side of said first set of spanning beams to said upper and lower vertically spaced spanning beams respectively;
upper and lower guide rails connected on the starboard side of said first set of spanning beams to said upper and lower vertically spaced spanning beams respectively;
upper and lower guide rails connected on the port side of said second set of spanning beams to said upper and lower vertically spaced spanning beams respectively; and
upper and lower guide rails connected on the starboard side of said second set of spanning beams to said upper and lower vertically spaced spanning beams respectively.

7. An apparatus for entrenching a submerged pipeline and the like within the bed of a body of water as defined in claim 6 wherein said guide rails include:
generally horizontally extending T-shaped slots.

8. An apparatus for entrenching a submerged pipeline and the like within the bed of a body of water as defined in claim 6 and further comprising:
a plurality of lock rails, one being connected to and extending generally coextensive with each of said upper and lower, port and starboard guide rails on said first set of spanning beams and said second set of spanning beams.

9. An apparatus for entrenching a submerged pipeline and the like within the bed of a body of water as defined in claim 8 wherein each of said lock rails includes:
a plurality of horizontally spaced locking apertures; and
a locking bolt operably connected to the locking rail adjacent each of said horizontally spaced locking apertures.

10. An apparatus for entrenching a submerged pipeline and the like within the bed of a body of water as defined in claim 6 and further comprising:
a plurality of vertically spaced horizontally extending cantilever support arms extending from each of the fore and aft portions of said port and starboard cutter and eductor heads,
each one of said support arms is fitted with an end element and connected thereto, and
said support arms being operably vertically spaced so that,
a pair of the plurality of support arms extending from the fore portion of said port cutter and eductor head are selectively engageable with the upper and lower guide rails on the port side of said first set of spanning beams, and
a pair of the plurality of support arms extending from the aft portion of said port cutter and eductor head are concurrently selectively engageable with the upper and lower guide rails on the port side of said second set of spanning beams, and
a pair of the plurality of support arms extending from the fore portion of said starboard cutter and eductor head are selectively engageable with the upper and lower guide rails on the starboard side of said first set of spanning beams, and
a pair of the plurality of support arms extending from the aft portion of said starboard cutter and eductor head are concurrently selectively engageable with the upper and lower guide rails on the starboard side of said second set of spanning beams.

11. An apparatus for entrenching a submerged pipeline and the like within the bed of a body of water as defined in claim 10 and further comprising:
a port adjustment motor connected between said box frame and said port cutter and eductor head for horizontally adjusting said cutter and eductor head upon said guide rails on the port side of said first and second set of spanning beams; and
a starboard adjustment motor connected between said box frame and said starboard cutter and eductor head for horizontally adjusting the starboard cutter and eductor head upon said guide rails on the starboard side of said first and second set of spanning beams.

12. An apparatus for entrenching a submerged pipeline and the like within the bed of a body of water as defined in claim 10 wherein:
said guide rails comprise horizontally extending T-slots; and
said end elements comprise horizontally extending T-shaped fittings operably engageable within a corresponding guide rail T-slot.

13. An apparatus for entrenching a submerged pipeline and the like within the bed of a body of water as defined in claim 12 and further comprising:
a plurality of lock rails, one being connected to and extending generally coextensive with each of said upper and lower, port and starboard guide rails on the first set of spanning beams and the second set of spanning beams;
said lock rails each include,
a plurality of horizontally spaced locking apertures, and
a locking bolt operably connected to the locking rail adjacent each of said horizontally spaced locking apertures;
said T-shaped fittings each include in a lower portion thereof a pair of horizontally spaced apertures operably spaced for alignment with said locking apertures in one of said locking rails whereby a pair of locking bolts may be selectively engageable through a corresponding pair of apertures in said T-shaped fittings and said locking rails to maintain a desired horizontal position of the port and starboard cutter and eductor heads with respect to said box frame.

14. An apparatus for entrenching a submerged pipeline and the like within the bed of a body of water comprising:
a burying sled, including
first and second pontoon skids having generally mutually parallel longitudinal axes, said pontoon skids being operably spaced to straddle a submerged pipeline to be entrenched, and a box frame bridging said first and second spaced pontoon skids including, a first set of upper and lower vertically spaced horizontally extending spanning beams connected between said first and second spaced pontoon skids and extending generally normally with respect to the longitudinal axes of said pontoon skids, and a second set of upper and lower vertically spaced horizontally extending spanning beams connected between said first and second spaced pontoon skids and extending generally normally with respect to the longitudinal axes of said pontoon skids, said second set of spanning beams extending generally parallel with respect to said first set of spanning beams and being offset with respect thereto; and means connected to said burying sled for cutting a trench beneath a submerged pipeline within the bed of the body of water comprising:

a first cutter head including, a first conduit segment having a central longitudinal axis operably positionable generally vertically along one side of a pipeline to be entrenched, said first conduit segment having:

a plurality of jetting apertures fashioned therein, a second conduit segment connected at one end to said first conduit segment, said second conduit segment having a central longitudinal axis extending at an angle with respect to the central longitudinal axis of said first conduit segment, said second conduit segment having, a plurality of jetting apertures fashioned therein, a third conduit segment connected at one end to the other end of said second conduit segment, said third conduit segment having a central longitudinal axis extending at an angle with respect to the central longitudinal axis of said second conduit segment and generally parallel with respect to the central longitudinal axis of said first conduit segment, said third conduit segment having, a plurality of jetting apertures fashioned therein, and a second cutter head including, a first conduit segment having a central longitudinal axis operably positionable generally vertically along an opposite side of a pipeline to be entrenched, said first conduit segment having, a plurality of jetting apertures fashioned therein, a second conduit segment connected at one end to said first conduit segment, said second conduit segment having a central longitudinal axis extending at an angle with respect to the central longitudinal axis of said first conduit segment, said second conduit segment having, a plurality of jetting apertures fashioned therein, a third conduit segment connected at one end to the other end of said second conduit segment, said third conduit segment having a central longitudinal axis extending at an angle with respect to the central longitudinal axis of said second conduit segment and generally parallel with respect to the central longitudinal axis of said first conduit segment, said third conduit segment having, a plurality of jetting apertures fashioned therein, wherein said first conduit segments of said first and second cutter heads have generally mutually parallel central longitudinal axes and are operatively adapted to extend generally vertically on opposite sides of a pipeline to be entrenched, and said third conduit segments of said first and second cutter heads have generally mutually parallel central longitudinal axes and extend generally vertically beneath a pipeline to be entrenched whereby the perpendicular distance between the generally mutually parallel longitudinal axes of said first conduit segments is greater than the perpendicular distance between the generally mutually parallel longitudinal axes of said third conduit segments.

15. An apparatus for entrenching a submerged pipeline and the like within the bed of a body of water as defined in claim 14 and further comprising:

means connected to said burying sled for withdrawing particles of fluidized material from adjacent said means for cutting comprising:

a first eductor head having first, second and third conduit segments positioned adjacent to and extending generally coextensive with said first, second and third conduit segments respectively of said first cutter head, and a second eductor head having first, second and third conduit segments positioned adjacent to and extending generally coextensive with said first, second and third conduit segments respectively of said second cutter head.

16. An apparatus for entrenching a submerged pipeline and the like within the bed of a body of water as defined in claim 14 and further comprising:

upper and lower guide rails connected on the port side of said first set of spanning beams to said upper and lower vertically spaced spanning beams respectively;

upper and lower guide rails connected on the starboard side of said first set of spanning beams to said upper and lower vertically spaced spanning beams respectively;

upper and lower guide rails connected on the port side of said second set of spanning beams to said upper and lower vertically spaced spanning beams respectively; and upper and lower guide rails connected on the starboard side of said second set of spanning beams to said upper and lower vertically spaced spanning beams respectively.

17. An apparatus for entrenching a submerged pipeline and the like within the bed of a body of water as defined in claim 16 and further comprising:

a plurality of vertically spaced horizontally extending support arms extending from each of the fore and aft portions of said port and starboard cutter and eductor heads, each one of said support arms is fitted with an end element connected thereto, and said support arms being operably vertically spaced so that;

a pair of the plurality of support arms extending from the fore portion of said port cutter and eductor head are selectively engageable with the upper and lower guide rails on the port side of said first set of spanning beams, and a pair of the plurality of support arms extending from the aft portion of said port cutter and eductor head are concurrently selectively engageable with the upper and lower guide rails on the port side of said second set of spanning beams, and a pair of the plurality of support arms extending from the fore portion of said starboard cutter and eductor head are selectively engageable with the upper and lower guide rails on the starboard side of said first set of spanning beams, and a pair of the plurality of support arms extending from the aft portion of said starboard cutter and eductor head are concurrently selectively engageable with the upper and lower guide rails on the starboard side of said second set of spanning beams.

18. An apparatus for entrenching a submerged pipeline and the like within the bed of a body of water as defined in claim 17 wherein :

said guide rails comprise horizontally extending T-slots; and said end elements comprise horizontally extending T-shaped fittings operably engageable within a corresponding guide rail T-slot.

19. An apparatus for entrenching a submerged pipeline and the like within the bed of a body of water as defined in claim 18 and further comprising:

a plurality of lock rails, one being connected to and extending generally coextensive with each of said upper and lower port and starboard guide rails on the first set of spanning beams and the second set of spanning beams;

said lock rails each include, a plurality of horizontally spaced locking apertures, and a locking bolt operably connected to the locking rail adjacent each of said horizontally spaced locking apertures;

said T-shaped fittings each include in a lower portion thereof a pair of horizontally spaced apertures operably spaced for alignment with said locking apertures in one of said locking rails whereby a pair of locking bolts may be selectively engageable through a corresponding pair of apertures in said T-shaped fittings and said locking rails to maintain a desired horizontal position of the port and starboard cutter and eductor heads with respect to said box frame.

* * * * *